United States Patent [19]

Hindt

[11] Patent Number: 5,338,146
[45] Date of Patent: Aug. 16, 1994

[54] DOLLY CARRIER

[76] Inventor: Gary L. Hindt, 1849 Andrews Dr., Concord, Calif. 94521

[21] Appl. No.: 23,017

[22] Filed: Feb. 25, 1993

[51] Int. Cl.$^5$ .................................................. B60R 9/00
[52] U.S. Cl. ................................ 414/462; 224/42.45 R; 224/282; 414/547; 414/728
[58] Field of Search ............... 414/462, 546, 547, 463, 414/466, 743, 728; 224/42.45 R, 282

[56] References Cited

U.S. PATENT DOCUMENTS

| | | | |
|---|---|---|---|
| 3,011,669 | 12/1961 | Sylvester | 414/462 |
| 3,539,062 | 11/1970 | Allen . | |
| 3,627,158 | 12/1971 | Kobasic | 414/462 |
| 3,756,616 | 9/1973 | Sapp, Sr. | 280/79.1 |
| 4,060,258 | 11/1977 | Pigeon | 280/638 |
| 4,504,075 | 3/1985 | Dawson | 280/402 |
| 4,712,967 | 12/1987 | Farthing | 414/563 |
| 4,778,333 | 10/1988 | Youmans et al. | 414/563 |
| 4,822,069 | 4/1989 | Burgess | 280/402 |
| 4,840,534 | 6/1989 | Totty | 414/563 |
| 5,049,025 | 9/1991 | Roman | 414/429 |
| 5,083,895 | 1/1992 | McBirnie | 414/728 X |
| 5,112,070 | 5/1992 | Hahn | 280/79.4 |
| 5,209,628 | 5/1993 | Hassell | 414/462 |

*Primary Examiner*—David A. Bucci
*Assistant Examiner*—Janice Krizek
*Attorney, Agent, or Firm*—Townsend and Townsend Khourie and Crew

[57] ABSTRACT

A dolly carrier for carrying a dolly has a support arm slidably coupled to a guide member. The support arm has a dolly support surface configured to engage the dolly. The dolly support surface is movable between a storage position and a removal position. The removal position is at least closer to a wrecker bed side then the storage position.

3 Claims, 3 Drawing Sheets

DOLLY CARRIER

BACKGROUND OF THE INVENTION

The present invention relates to dolly carriers. Dollies are used for towing vehicles when it is undesirable to have the wheels of the towed vehicle touch the ground, such as when towing an automatic transmission vehicle.

Known dolly carriers are stanchions rigidly secured in a wrecker bed of the wrecker truck. Known stanchions are secured in the truck bed far enough from the wrecker bed so that the lateral clearance of the truck is not reduced.

To remove the dolly from the stanchion, the user must reach into the wrecker bed, lift the dolly from the stanchion, carry the dolly out of the wrecker bed, and lower the dolly to the ground.

A problem with known dolly carriers is that removal of the dolly can cause back and upper body injuries. The act of bending into the wrecker bed, lifting the dolly from the stanchion support, and carrying the dolly out of the bed is extremely stressful on the user's upper body and back muscles and painful injuries can result.

A further problem with known wrecker beds is that the wrecker beds have sills which the user must lift the dolly over. Wrecker bed sills are used to retain items in the wrecker bed.

SUMMARY OF THE INVENTION

The problem of having to bend into the wrecker bed to remove a dolly and the problem of having to carry the dolly over the wrecker bed sill is overcome in accordance with the present dolly carrier which includes a support member movable along a path including a storage position, which is in the area over the truck bed, and a removal position, which is at least nearer the area outside the truck bed. Preferably, the removal position is outside the wrecker bed so that the user does not have to lean into the wrecker bed at all.

The dolly carrier has a base having a bottom surface for securing the dolly carrier to the truck bed. A body is secured to the base and preferably includes two substantially parallel steel plates. A hollow guide member is rigidly secured to the steel plates. The dolly carrier has a dolly support member including a dolly support surface for carrying the dolly. The dolly support surface is configured to engage a dolly mounting surface of the dolly.

The dolly support member is preferably carried by a support arm which slidably engages the interior of the hollow guide member. The support arm telescopes within the hollow guide member for movement along the path. The dolly carrier also preferably includes a locking mechanism to lock the support arm in the storage position.

In another embodiment of the invention the guide member is pivotally connected to the body so that the dolly can also be lowered. A pair of steel guides is secured to the body at one end and secured to the base at the other. The steel guides are positioned on opposite sides of the support arm. A stop is positioned between the pair of steel members near the base. The stop engages the support arm when the support arm is extended from the guide member and pivoted toward the base.

The dolly carrier may be provided with a wrecker body. The wrecker body includes a wrecker bed having an outer perimeter and a wrecker truck side wall. The wrecker truck side wall defines an area over the truck bed and an area outside the truck bed. A sill extends generally vertically around the perimeter. The sill preferably includes a cut-out portion adjacent the dolly carrier so that the dolly does not have to be lifted over the sill. The sill cut-out portion is particularly advantageous when used with the pivotal dolly carrier having a removal position outside the area of the wrecker bed. The cut-out portion permits lowering the dolly below the wrecker bed side so that the height from which the user must manually lower the dolly is reduced. The cut-out also advantageously eliminates the need to carry the dolly over the sill even if the removal position is in the area over the wrecker bed.

Other features and advantages of the invention will appear from the following description in which the preferred embodiment has been set forth in detail in conjunction with the accompanying drawings.

DESCRIPTION OF THE PREFERRED EMBODIMENT

Figure 1:
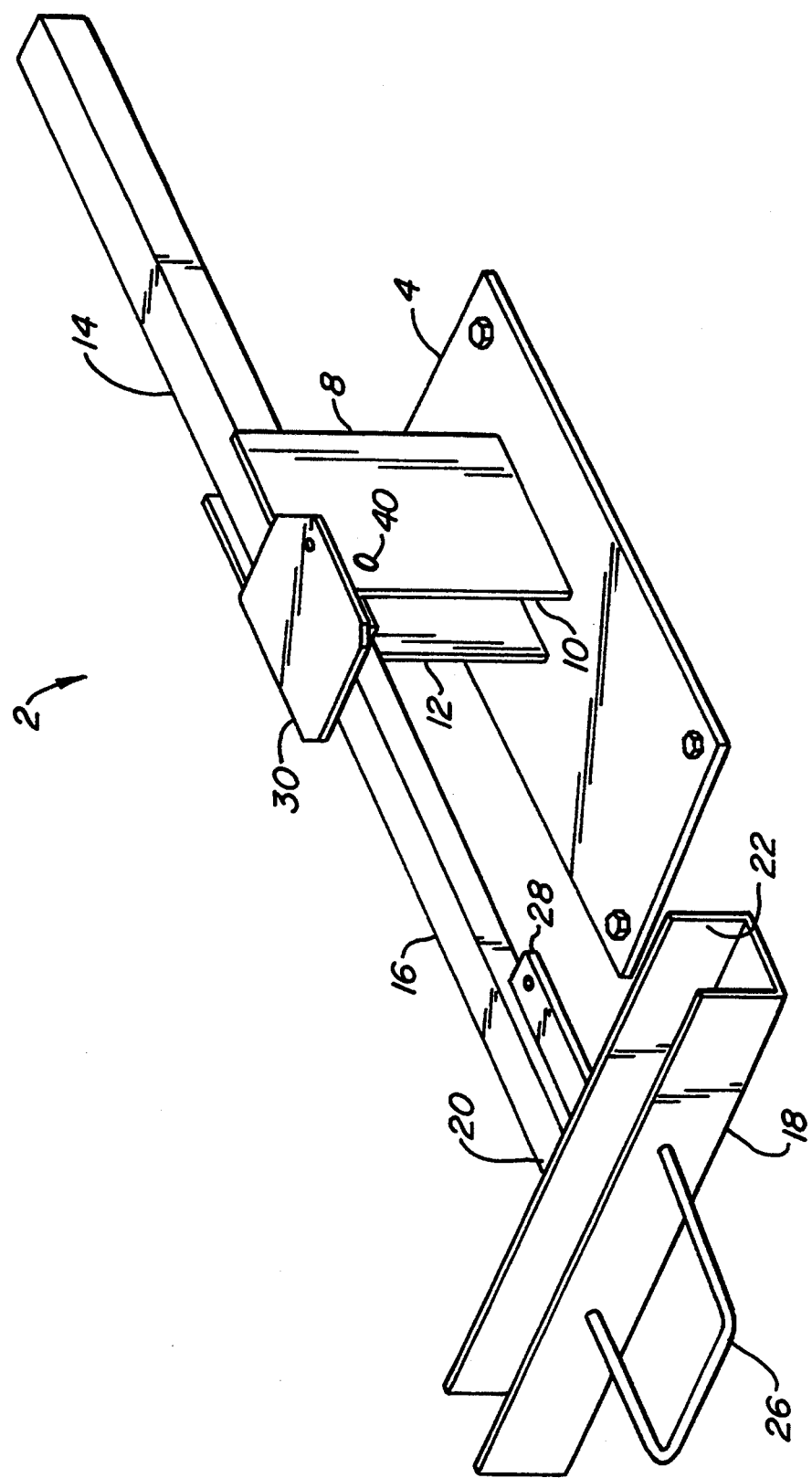
FIG. 1 is a perspective view of a dolly carrier having a support arm extending from a guide member.

FIG. 1 is a perspective view of a dolly carrier 2. The dolly carrier 2 includes a base 4 having four bolt holes for securing dolly carrier 2 to a wrecker bed (not shown). The dolly carrier 2 is configured to support a dolly (not shown) used for towing vehicles. The dolly carrier 2 has a dolly support surface 22 which is movable between a storage position (FIG. 2) over the truck bed to a removal position (FIG. 1) which is at least closer to the truck bed side. Preferably, the removal position extends beyond the truck bed side. The dolly carrier 2 minimizes the effort required to remove the dolly from the wrecker bed and reduces the likelihood of injury to a user removing the dolly from the wrecker bed.

A body 8 having two steel plates 10, 12 is secured to the base 4. The two steel plates 10, 12 extend perpendicular to the base 4 and parallel to each other. The steel plates 10, 12 are preferably welded to base 4.

A guide member 14 is rigidly supported between the steel plates 10, 12 either by welding, use of a mechanical fastener, or any other well known method. Guide member 14 is preferably a 14" long piece of 1½" square tube steel having a 0.120" wall thickness.

Figure 2:
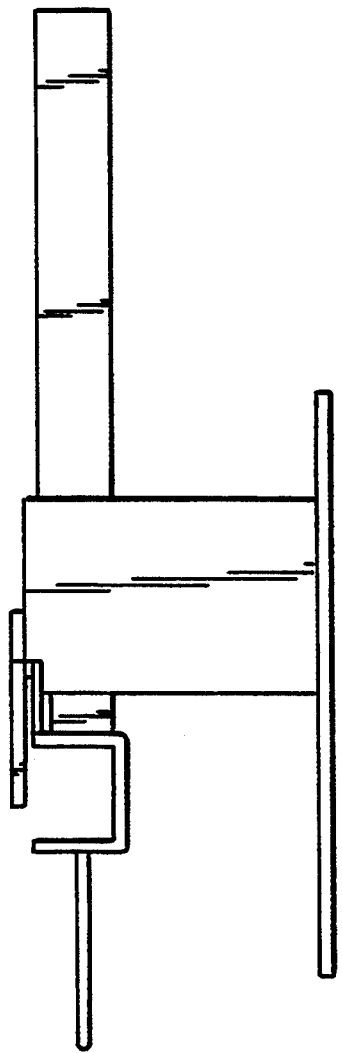
FIG. 2 is a side view of the dolly carrier with the support arm in a storage position.

A support arm 16 is slidably coupled to guide member 14 so that the dolly support surface 22 is movable between the removal position (FIG. 1) and the storage position (FIG. 2). Support arm 16 is sized to fit within the interior of guide member 14 and is preferably a 13" long piece of 1¼" square tube steel.

A dolly support member 18, which includes the dolly support surface 22, is secured at a support end 20 of support arm 16. The dolly support surface 22 is configured to engage a dolly mounting surface of the dolly. The dolly mounting surface preferably has a square cross section and, therefore, dolly support surface 22 is preferably formed from three sides of a complementary shaped channel section (FIG. 1). The preferred dolly support surface 22 is made from 2"×2" steel channel. A handle 26 is welded to dolly support member 18 for manipulating support arm 16.

FIG. 2 is a side view of the dolly carrier 2 with the support arm 16 retracted to the storage position. The dolly carrier 2 is secured in a wrecker bed so that extension of the support arm 16 from the storage position of FIG. 2 to the removal position of FIG. 1 moves dolly support member 18 at least nearer the wrecker bed side to facilitate removing the dolly from the wrecker bed. Preferably, support arm 16 and guide member 14 are sized so that support arm 16 extends beyond the wrecker bed side thereby eliminating the need for a user to reach into the wrecker bed to remove the dolly and reducing the stress on the user when removing the dolly.

Guide member 14 guides the support member 18 along a substantially linear path. The path may, however, take many shapes so long as the path includes a storage position over the wrecker bed and a removal position at least closer the wrecker bed side. The path may be linear, arcuate, bilinear, or a combination thereof. The guide member 14 may also take many forms including a track which engages wheels on the support member, an arm pivoting between the storage and removal positions, or a combination thereof.

The support arm 16 can be locked in the storage position with first and second lock plates 28, 30 so that the support arm 16 does not inadvertently extend from guide member 14 during transportation (FIG. 2). The first lock plate 28 is welded to the support member 18 and the second lock plate 30 is welded to the body 8. The first and second lock plates 28, 30 have lock holes which align when the support arm 16 is in the storage position. A lock (not shown) is positioned through the first and second lock holes 28, 30 for locking the support arm 16 in the storage position.

The second lock plate 30 advantageously extends over the support member 18 when the support arm 16 is in the storage position so that the dolly is trapped between the second lock plate 30 and the dolly support member 18 (FIG. 2). Thus, the first and second lock plates 28, 30 not only lock the support arm 16 in the storage position but also lock the dolly to the dolly carrier 2.

Figure 4:
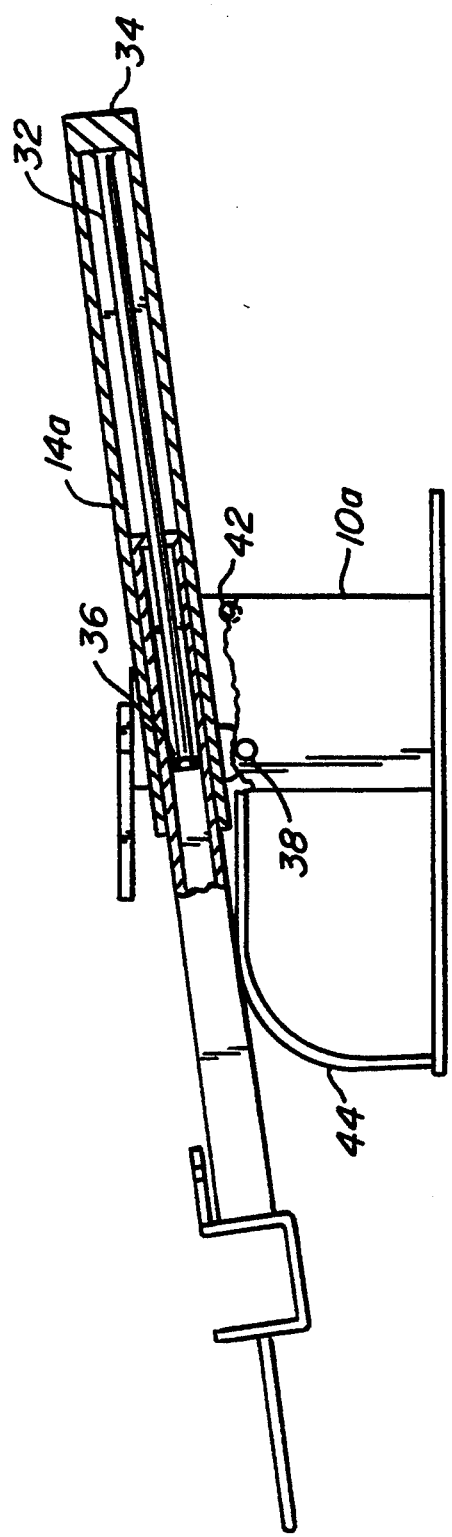
FIG. 4 is a partial cross-section of the pivotal dolly carrier.
Figure 3:
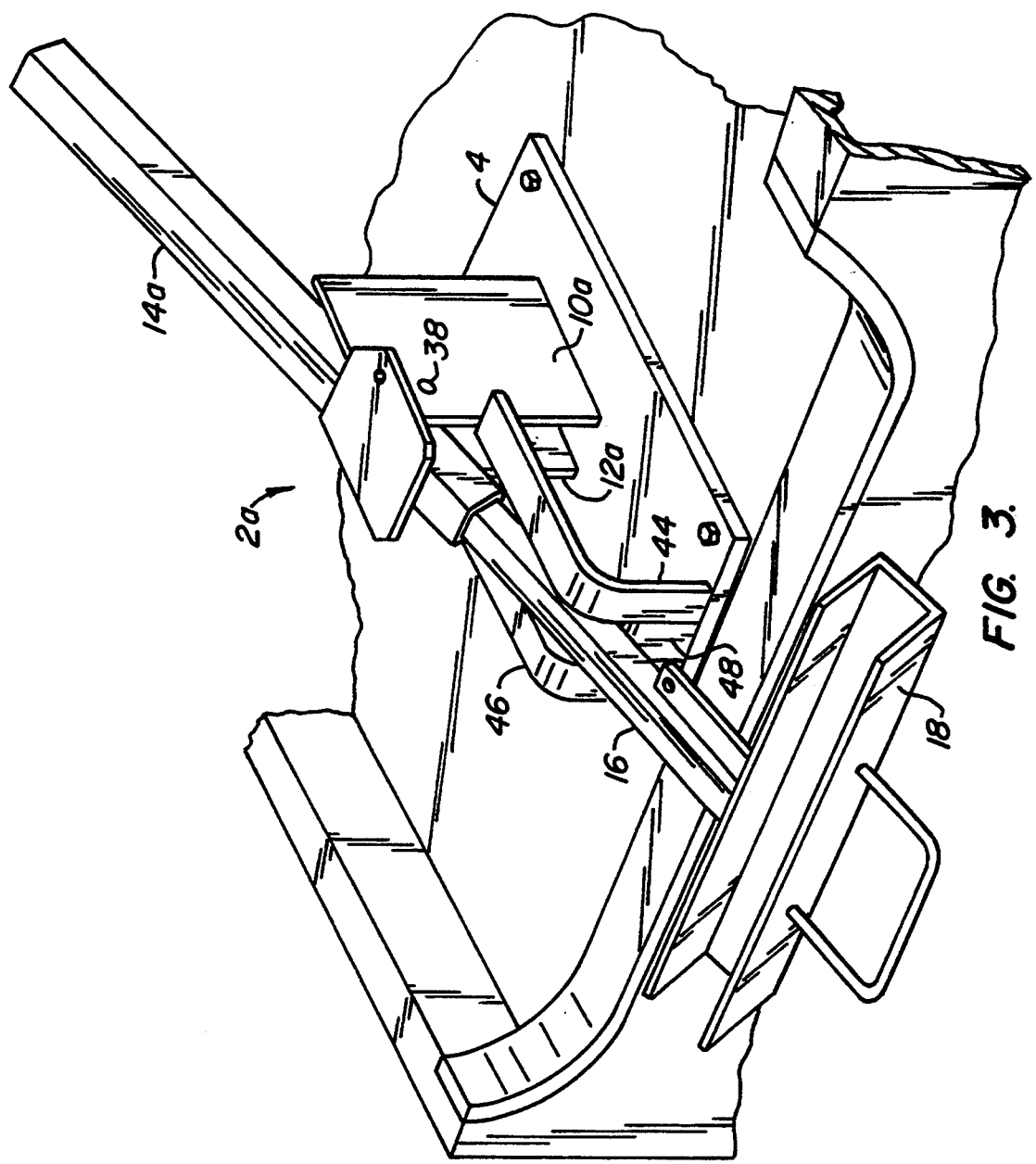
FIG. 3 is a perspective view of a pivotal dolly carrier secured to a wrecker bed.

FIGS. 3 and 4 illustrate a second embodiment of the invention. A pivotal dolly carrier 2a has a guide member 14a pivotally connected to the base 4. The base 4, support arm 16, and support member 18 are the same as those described above for dolly carrier 2.

A steel dowel 38 is welded to the bottom of guide member 14a and extends through a pivot hole 40 in steel plates 10a, 12a for pivoting guide member 14a (FIG. 4). Any other pivoting mechanism may be used, such as a conventional hinge. A piece of steel tubing 42 is welded between the steel plates 10a, 12a nearer the distal end 34 than the steel dowel 38 (FIG. 4). The steel tubing 42 limits rotation of the guide member 14a and stabilizes the guide member 14a when manipulating the support arm 16.

The pivotal dolly carrier 2a includes two steel guides 44, 46 secured to the body 8a at a first end and secured to the base 4 at a second end. A stop 48 is positioned between the steel guides 44, 46 near the second end. The steel guides 44, 46 and stop 48 help to guide the support arm 16 into the removal position as described below.

The pivotal guide member 14a advantageously allows the user to lower the dolly thereby reducing the height the user must manually lower the dolly. The pivotal guide member 14a is particularly advantageous when the support arm 16 is sized to extend beyond the wrecker bed side as shown in FIG. 3.

An extension limiting mechanism is also provided so that the support arm 16 cannot disengage from the guide member 14 (FIG. 4). The extension limiting mechanism includes a steel bar 32 plug welded to a distal end 34 of the guide member 14. The steel bar 32 has a washer 36 welded at an opposite end. The steel bar 32 extends through a hole in an end plate of the support arm which is sized smaller than washer 36 so that washer 36 acts as an end stop for support arm 16. The support arm 16 can extend from the guide member 14 until the end plate abuts against washer 36.

The pivotal dolly carrier 2a and dolly carrier 2 may be provided independently or with a wrecker body. If dolly carrier 2 is supplied with a wrecker body, the base 4 of the pivotal dolly carrier 2a is secured to a wrecker bed, preferably by welding or with a mechanical fastener. FIG. 3 shows pivotal dolly carrier 2a secured to the wrecker bed.

The wrecker bed has a sill 52 partially surrounding the wrecker bed. The sill 52 helps to keep items stored in the wrecker bed from falling out during transportation. Preferably, the sill 52 includes a cut-out 54 adjacent the dolly carrier 2. The sill cut-out 54 helps to reduce the height which dolly carrier 2 must be lowered when used in conjunction with the pivotal dolly carrier 2a as shown in FIG. 3.

To use the pivotal dolly carrier 2a, handle 26 is grasped and pulled so that the support arm 16 extends from the guide member 14a. Once the support arm 16 is extended far enough so that the support arm 16 will engage the stop 48, the support arm 16 is lowered to contact the stop 48. Once the support arm 16 is lowered and supported by the stop 48 the user simply pulls on handle 26 to extend the support arm 16 to the removal position. The stop 48 advantageously reduces the effort required to remove the dolly from the wrecker bed. The angle of the support arm 16 utilizes the weight of the dolly to overcome frictional resistance between the support arm 16 and the stop 48.

The path along which the dolly support member 18 travels depends upon whether the stop 48 is utilized. Once again, however, the path along which the dolly support surface 22 travels can take many forms so long as the path includes a storage position over the wrecker bed and a removal position at least closer to the wrecker bed side.

Modifications and variations can be made to the disclosed embodiments without departing from the subject of the invention as defined by the following claims. For example, the base 4 can be a pedestal supported on four feet rather than a flat plate and the guide member can pivot in a horizontal plane rather than a vertical plane.

What is claimed is:

1. A wrecker body for a truck, the wrecker body comprising:
    a generally flat truck bed having an outer perimeter, the truck bed defining an area over the truck bed extending perpendicularly to the truck bed;

a sill positioned along the outer perimeter of the truck bed and extending perpendicularly to the generally flat truck bed, the sill having a cut-out portion; and a dolly carrier comprising:

a body coupled to the truck bed adjacent to the cut-out portion;

a guide member pivotally coupled to the body;

a support arm slidably coupled to the guide member, the support arm having a dolly support member rigidly attached to a support end, the support arm being slidable relative to the guide member between a storage position, wherein the dolly support member is in the area over the truck bed, and a removal position, wherein the dolly support member is in an area outside the area over the truck bed and the support arm passes through the cut-out portion of the sill; and a means for locking the support arm in the storage position, the locking means including a first lock plate attached to the dolly support member, the first lock plate having a first hole, and a second lock plate attached to the body, the second lock plate having a second hole, whereby the support arm is locked in the storage position by aligning the first and second holes and positioning a lock through the first and second holes.

2. The dolly carrier of claim 1 wherein said means for locking the support arm in the storage position holds the support arm so that the support arm cannot move relative to the body.

3. The dolly carrier of claim 1 wherein the dolly support member comprises a piece of steel channel.

* * * * *